(12) United States Patent
Houssian

(10) Patent No.: US 8,627,947 B2
(45) Date of Patent: Jan. 14, 2014

(54) FEED AUGER LIFT ASSEMBLY FOR AN AGRICULTURAL CONVEYOR

(75) Inventor: Terry Douglas Houssian, Regina (CA)

(73) Assignee: Sakundiak Equipment Ltd., Regina, Saskatchewan (CA)

( * ) Notice: Subject to any disclaimer, the term of this patent is extended or adjusted under 35 U.S.C. 154(b) by 0 days.

(21) Appl. No.: 13/605,094

(22) Filed: Sep. 6, 2012

(65) Prior Publication Data

US 2013/0232935 A1    Sep. 12, 2013

Related U.S. Application Data

(60) Provisional application No. 61/531,179, filed on Sep. 6, 2011.

(51) Int. Cl.
*B65G 33/32* (2006.01)

(52) U.S. Cl.
CPC ..................... *B65G 33/32* (2013.01)
USPC ......... 198/668; 198/317; 198/318; 198/316.1

(58) Field of Classification Search
USPC .............. 198/668, 313, 314, 315, 316.1, 317, 198/318; 56/16.6
See application file for complete search history.

(56) References Cited

U.S. PATENT DOCUMENTS

| | | | |
|---|---|---|---|
| 3,175,676 A * | 3/1965 | Vander Schaaf | 198/550.2 |
| 4,603,775 A | 8/1986 | Plett | |
| 4,963,066 A | 10/1990 | Boppart | |
| 5,184,715 A | 2/1993 | Feterl | |
| 5,305,866 A | 4/1994 | Stewart et al. | |
| 5,498,119 A * | 3/1996 | Faivre | 414/528 |
| 5,788,055 A | 8/1998 | Stewart et al. | |
| 6,283,269 B1 * | 9/2001 | Mayer | 198/313 |
| 7,191,889 B1 | 3/2007 | Heley | |
| 7,428,956 B2 | 9/2008 | Scherman | |
| 8,272,494 B2 * | 9/2012 | Zazula et al. | 198/313 |
| 8,317,013 B2 * | 11/2012 | Sanders | 198/667 |

FOREIGN PATENT DOCUMENTS

EP    0684198    11/1995

* cited by examiner

*Primary Examiner* — Mark A Deuble
(74) *Attorney, Agent, or Firm* — Ryan W. Dupuis; Kyle R. Satterthwaite; Ade & Company Inc.

(57) ABSTRACT

An agricultural conveyor assembly of the type including a main conveyor, a feed auger assembly, and a main auger boot pivotally supporting the outlet end of the feed auger assembly on the inlet end of the main conveyor for swinging movement further includes a feed auger lift assembly. The feed auger lift assembly includes a bearing surface supported about an inlet opening of the main auger boot and one or more extendable lift members extending between a first end pivotally coupled to the feed auger assembly and a second end supported on the bearing surface for rotational movement about a feed auger swing axis together with the feed auger assembly.

17 Claims, 4 Drawing Sheets

FEED AUGER LIFT ASSEMBLY FOR AN AGRICULTURAL CONVEYOR

This application claims the benefit under 35 U.S.C. 119 (e) of U.S. provisional application Ser. No. 61/531,179, filed Sep. 6, 2011.

FIELD OF THE INVENTION

The present invention relates to a lift assembly for lifting a feed auger tube relative to a main tube in an agricultural conveyor, and more particularly the present invention relates to a lift assembly comprising at least one hydraulic lift cylinder coupled between the feed auger tube and an annular bearing surface about the inlet opening of a main auger boot coupling the feed auger tube to the main tube.

BACKGROUND

Various forms of agricultural conveyors are known for transferring grain or other particulate material from a source area to a target area, for example from a transport container to a bin or other storage type container. Transport containers generally involve a container supported for rolling movement along the ground by wheels spaced apart at opposing ends of the container. A hopper type discharge is then typically located between the wheels below the container for discharging into the auger which subsequently conveys the material to the storage container.

A common construction of an agricultural conveyor includes a main auger tube and a swinging feed auger which is pivotally coupled to the inlet end of the main auger tube. U.S. Pat. Nos. 5,184,715 to Feterl; 5,305,866 and 5,788,055 both to Stewart et al; 4,963,066 to Boppart; 4,603,775 to Plett; and 7,191,889 to Heley; and European Patent Application 0 684 198 disclose various examples of grain augers used for conveying particulate materials including a swing or feed auger. In each instance the main auger is supported on a wheeled frame for positioning of the discharge in alignment with the target area. The swing auger is provided at the inlet of the main auger for alignment with the source, for example the discharge hopper of a transport container.

Due to the swinging motion of the feed auger typically being driven by wheels on the inlet hopper of the feed auger which engage the ground, lifting of the feed auger is typically by a mechanism supported on the main auger tube above the feed auger in such a manner so as to prevent pivoting of the feed auger overtop of the main auger between two opposing lateral positions relative to the feed auger. Such movement of the feed auger would be desirable to allow collecting particulate material from two sources on opposing sides of the main auger while the conveyor remains connected to a towing vehicle such as a tractor.

U.S. Pat. No. 7,428,956 by Scherman discloses an improved feed auger assembly for a conveyor including first and second auger sections which are pivotal relative to one another allowing the loading hopper to be placed through an infinite number of positions about the inlet end of the main auger. A hydraulic cylinder drives pivotal movement of the second auger section relative to the main auger, but the hydraulic cylinder prevents pivoting of the auger sections across the main auger between two opposing sides of the main auger.

SUMMARY OF THE INVENTION

According to one aspect of the invention there is provided an agricultural conveyor assembly comprising:

a main conveyor comprising a main conveyor tube and a main conveying member in the main conveyor tube which is arranged to convey particulate material from an inlet end to an outlet end of the main conveyor tube;

a frame supporting the main conveyor tube at an upward incline from the inlet end to the outlet end in a working position of the main conveyor;

a loading hopper having a loading opening arranged to load the particulate material therein;

a feed auger assembly extending in a longitudinal direction from an inlet end in communication with the loading hopper so as to be arranged to receive the loaded particulate material from the loading hopper to an outlet end in communication with the inlet end of the main conveyor so as to be arranged to discharge the loaded particulate material into the inlet end of the main conveyor;

a main auger boot coupled to the inlet end of the main conveyor tube and pivotally supporting the outlet end of the feed auger assembly thereon such that the feed auger assembly is pivotal relative to the main conveyor tube about a generally upright swing axis and about a generally horizontal lift axis;

the main auger boot including an inlet opening arranged to receive the particulate material from the feed auger assembly therethrough at the inlet end of the main conveyor tube;

a bearing surface supported about the inlet opening of the main auger boot; and at least one extendable lift member extending between a first end pivotally coupled to the feed auger assembly and a second end supported on the bearing surface for rotational movement about the swing axis together with the feed auger assembly.

By supporting lift members on a bearing surface about the inlet opening, the lift members does not restrict pivotal movement of the feed auger assembly and permits the feed auger assembly to be readily displaced overtop of the main auger between two laterally opposed loading positions if desired.

The bearing surface preferably comprises an annular member extending about a full circumference of the inlet opening and which is supported on an upper wall of the main auger boot.

In the preferred embodiment, two extendable lift members are operatively connected to one another and are pivotally coupled at respective second ends about a horizontal axis to respective lift member mounts which are engaged upon the annular bearing surface for rotational movement about the swing axis together with the feed auger assembly.

Preferably the extendable lift members are connected to the feed auger assembly at diametrically opposed sides of the feed auger tube.

The second ends of the extendable lift members are preferably supported below the first end of the extendable lift member through a full range of pivotal movement of the feed auger assembly about the lift axis.

When the feed auger comprises a feed auger head pivotally coupled to the main auger boot at the outlet end of the feed auger assembly and a feed auger tube coupled to the feed auger head for pivotal movement together relative to the main conveyor, preferably the first end of the extendable lift members are coupled to the feed auger assembly adjacent a junction of the feed auger head with the feed auger tube.

Preferably the feed auger assembly further comprises a guide member connected to the extendable lift member such that the second end of the lift member is movable together with the feed auger assembly for rotational movement about the swing axis.

The extendable lift member is preferably operable between a retracted position in which the loading hopper is arranged to be supported adjacent to the ground and an extended position in which the lift member is extended in length between the first and second ends and the loading hopper is elevated in relation to the retracted position.

Preferably the lift member is arranged for pivotal movement about the swing axis together with the feed auger assembly through an intermediate position overtop of the main conveyor between a first offset position in which the feed auger assembly extends outwardly from one side of the main conveyor in a first lateral direction and a second offset position in which the feed auger assembly extend outwardly from the other side of the main conveyor in a second lateral direction opposite to the first lateral direction. In this instance the feed auger assembly extends from the discharge end at the inlet end of the main conveyor to the loading hopper towards the outlet end of the main conveyor in the intermediate position.

The conveyor assembly may further comprise an annular driven member supported about the inlet opening of the main auger boot for rotation relative to the main conveyor about the swing axis together with the feed auger assembly, and a swing drive motor coupled to the annular driven member so as to be arranged to rotate the annular driven and the feed auger assembly therewith about the swing axis.

The annular driven member is preferably supported below the bearing surface.

When the main auger boot comprises an upper wall supporting the bearing surface spaced thereabove, the annular driven member is preferably received between the upper wall of the main auger boot and the bearing surface.

When the swing drive motor is supported on the main conveyor spaced radially outward from the annular driven member in relation to the swing axis, the annular driven member may comprise a circumferential gear operatively connected to swing drive motor.

The feed auger assembly may include a pair of auger mounts extending upwardly from annular driven member at diametrically opposing sides of the inlet opening in which the auger mounts pivotally couple the discharge end of the feed auger assembly thereon for relative pivotal movement about substantially horizontal lift axis.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
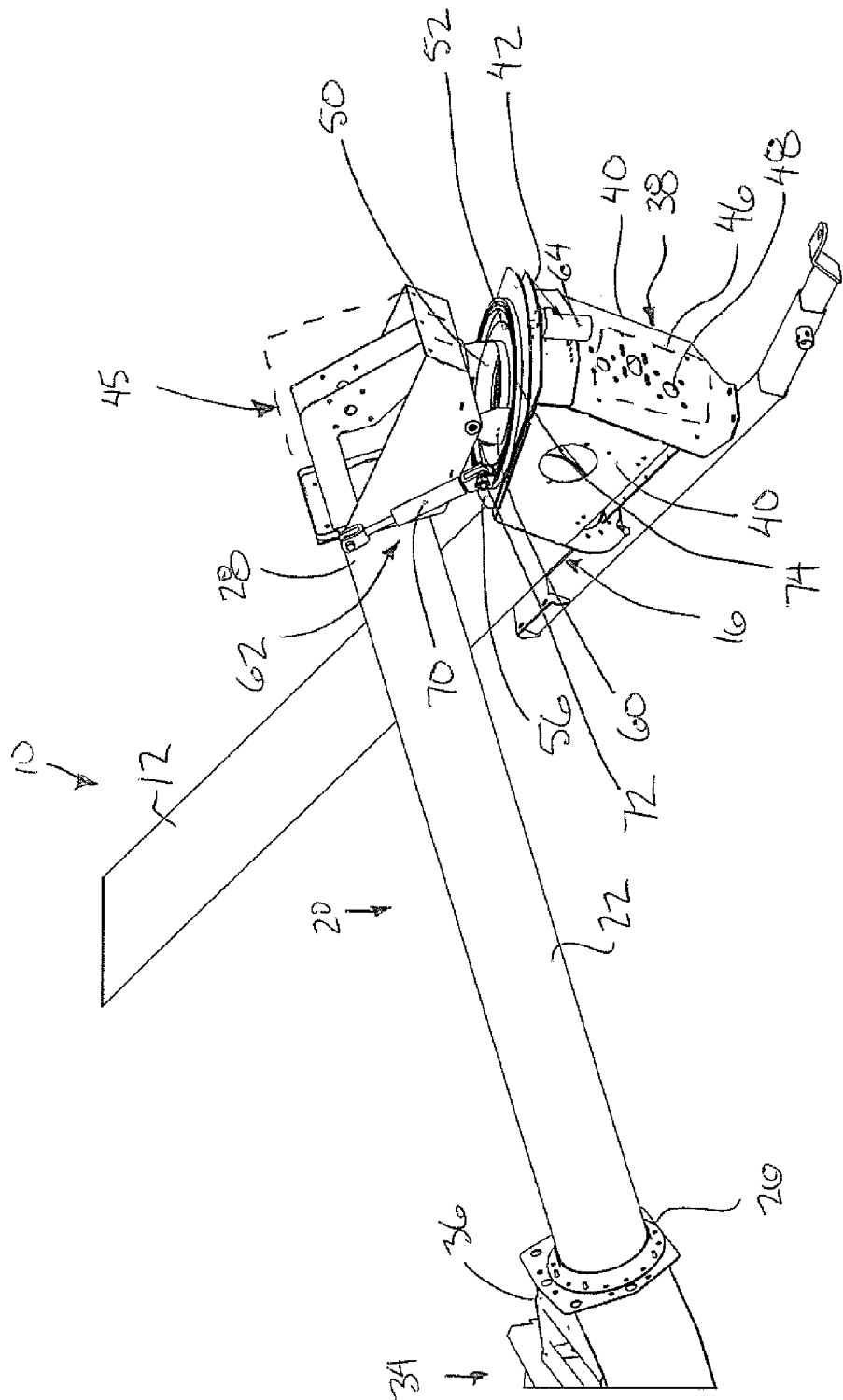
FIG. 1 is a perspective view of the feed auger assembly near a retracted position of the extendable lift members.
Figure 2:
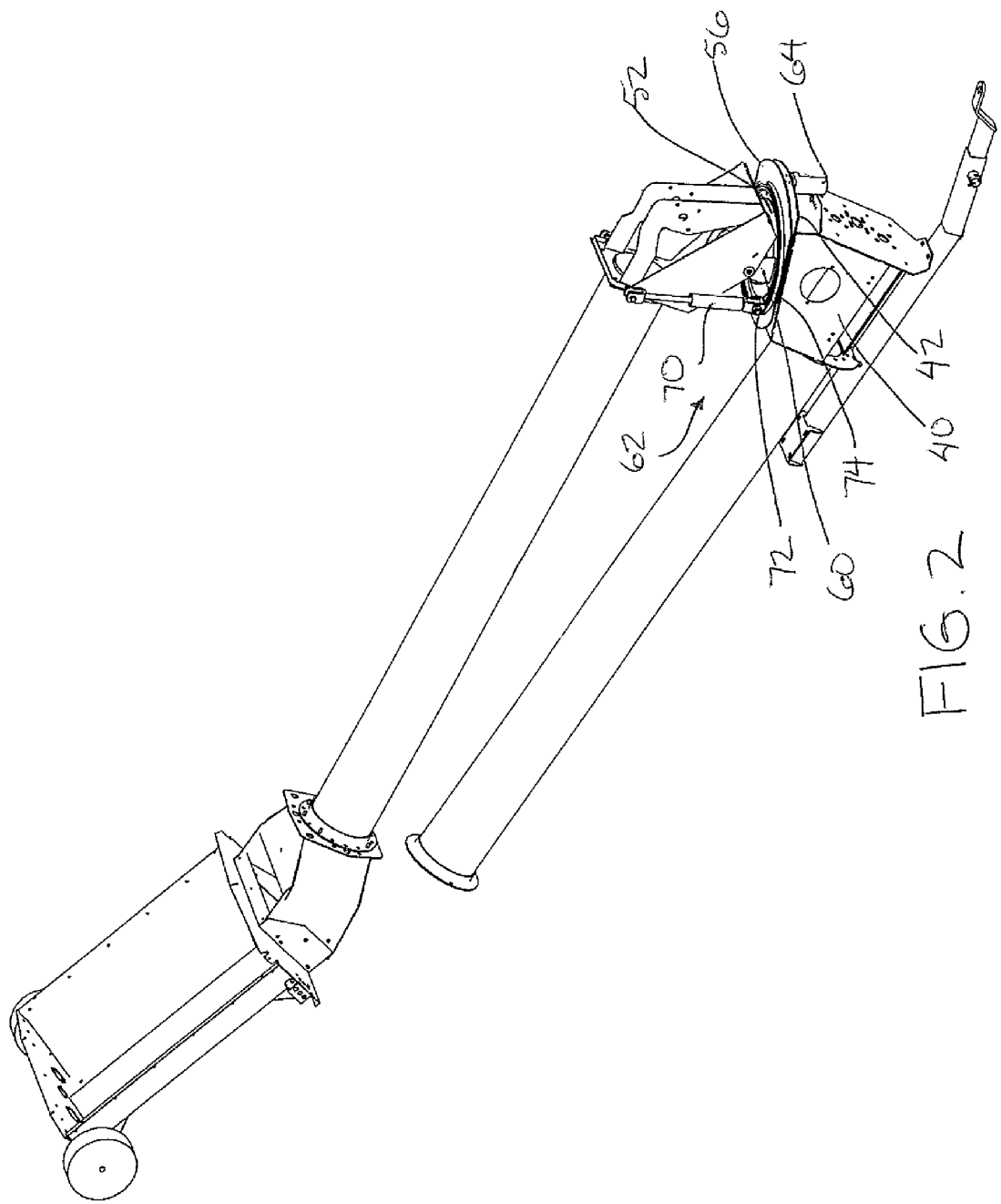
FIG. 2 is a perspective view of the feed auger assembly near in an extended position of the extendable lift members.
Figure 3:
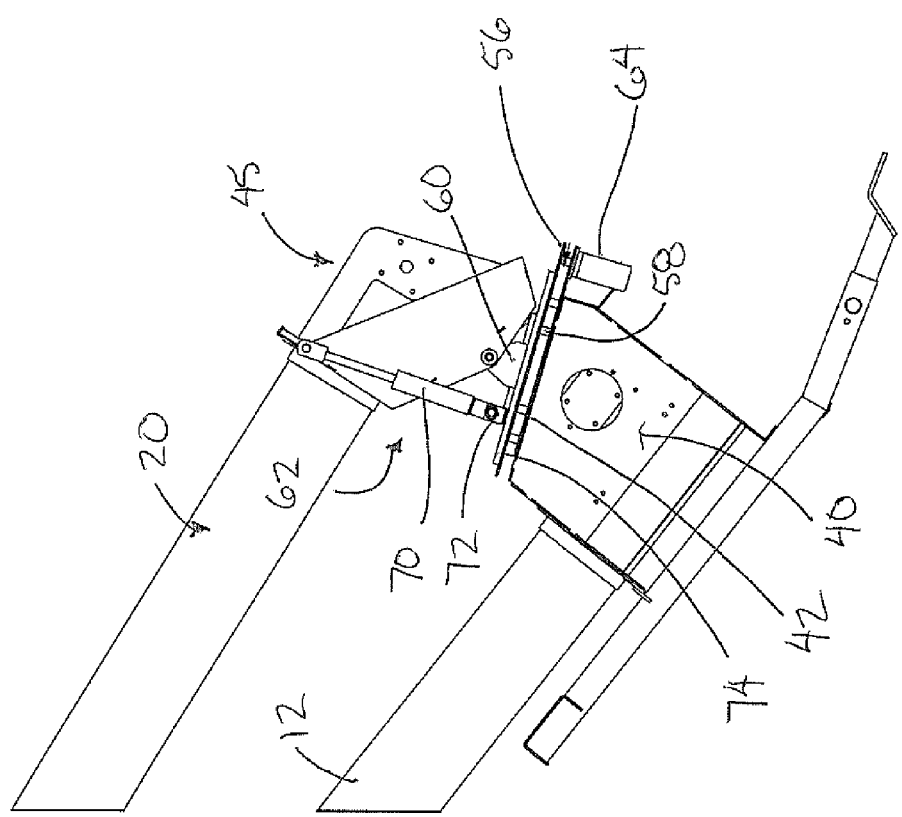
FIG. 3 is a side elevational view of the feed auger assembly in the position of FIG. 2.
Figure 4:
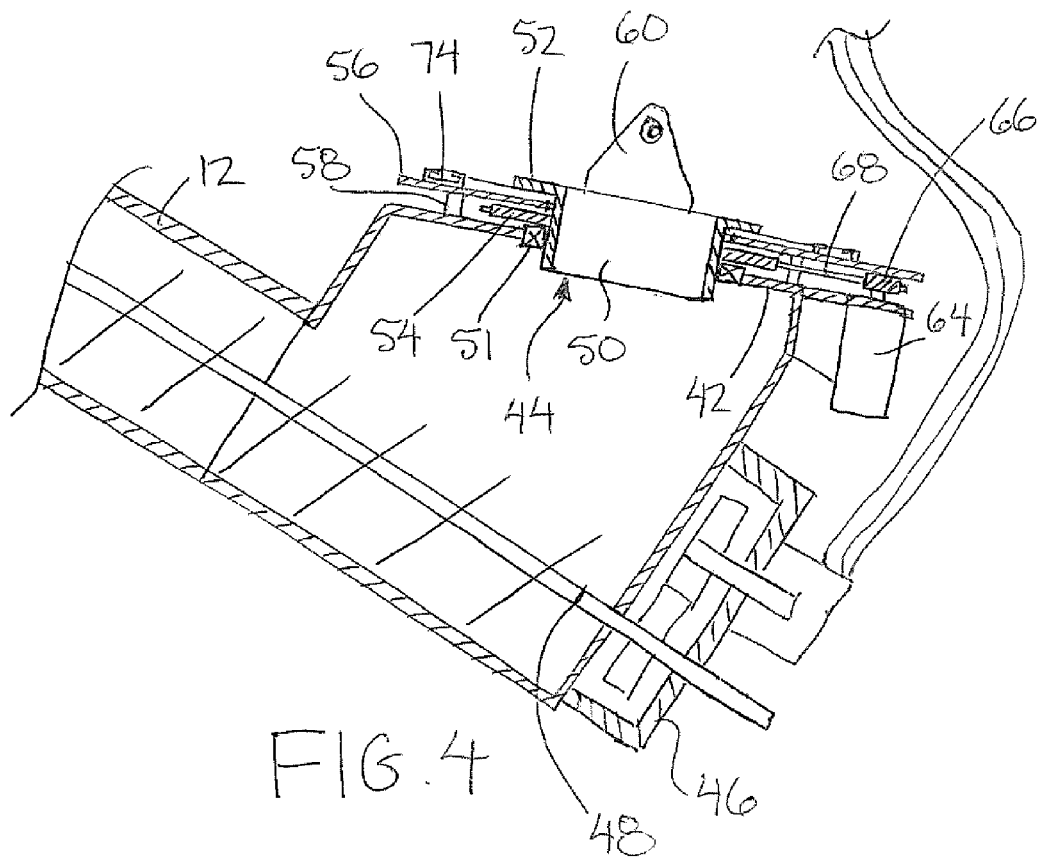
FIG. 4 is a vertical cross section through the main auger boot supporting the feed auger assembly on the main auger.
Figure 5:
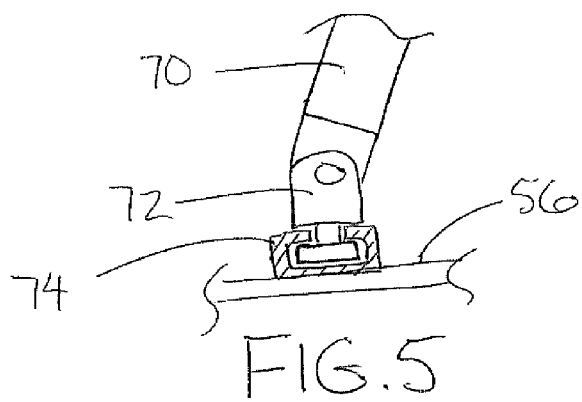
FIG. 5 is a sectional view of the annular bearing surface shown supporting the second end of one of the extendable lift members.

Referring to the accompanying figures there is illustrated a conveyor assembly generally indicated by reference numeral 10. The assembly 10 is suited for use as an agricultural auger for conveying particulate material, for example grain, seed or other similarly particulate materials.

The assembly 10 includes a main conveyor 12 comprised of a main conveyor tube 14 which is elongate in a respective longitudinal direction between an inlet end 16 and an outlet end (not shown). A main conveying member within the main conveyor tube 14 comprises an auger (not shown) in the illustrated embodiment which is rotatable about a longitudinal axis thereof to convey the particulate material from the inlet end to the outlet end.

The main conveyor also comprises a frame which supports the main conveyor tube 14 on wheels for rolling movement generally in the longitudinal direction of the conveyor. The frame comprises an adjustable linkage which supports the main conveyor through a range of movement between a working position extending at an upward incline from the inlet end adjacent the ground to the outlet end spaced upwardly and rearwardly therefrom and a transport position in which the main conveyor tube is nearer to horizontal than the working position. The main conveyor is generally shown in the working position in the accompanying figures.

The main conveyor further comprises a hitch connection 18 coupled to the main conveyor tube adjacent the inlet end thereof such that the hitch connection extends forwardly beyond the inlet end. The hitch connection permits the connection of the inlet end of the main conveyor tube to a towing vehicle such that the vehicle can be towed in the normal forward working direction of the vehicle with the main conveyor tube extending rearwardly from the inlet end to the outlet end trailing rearwardly therefrom.

The conveyor assembly 10 further comprises a feed auger assembly 20 coupled to the inlet end of the main conveyor tube to assist in loading particulate material into the main conveyor. The feed auger assembly generally comprises a feed auger tube 22 rotatably receiving a feed auger 24 for rotation about a respective longitudinal axis so as to convey material from an inlet end 26 thereof to a respective outlet end 28 to discharge particulate material from the hopper into the inlet end of the main conveyor. The feed auger assembly is pivotal about a first upright swing axis at the inlet end of the main conveyor tube and about a second horizontal lift axis also adjacent the inlet end of the main conveyor tube.

A loading hopper 34 is provided for loading the particulate material into the inlet end of the feed auger tube 22 of the feed auger assembly. The hopper 34 is fixed to the inlet end of the feed auger assembly for movement therewith about the upright swing axis and the lift axis. The hopper is similar to many conventional swing auger hoppers so as to be both wider and longer than it is in height and so as to be relatively low in profile for being received under the discharge of various implements such as the discharge chute under particulate material carrying trailers for example. The hopper includes an open top end spanning substantially the full width and length of the hopper into which particulate material is arranged to be received. A suitable conveying mechanism at the bottom end of the hopper conveys the loaded particulate material through a discharge 36 connected to the inlet end of the feed auger assembly to which it is coupled. The material is then conveyed in the longitudinal direction of the feed auger assembly from the inlet end to the outlet end prior to the loading into the main conveyor tube.

The main conveyor tube is provided with an inlet housing 38 in the form of a main auger boot at the inlet end thereof for supporting the feed auger assembly 28 pivotally thereon. The inlet housing or main auger boot 38 substantially surrounds the inlet end of the main conveyor tube and comprises two side walls 40 extending upwardly above the tube at opposing sides thereof to define a receiving chamber above the tube in open communication with the conveying member rotatable within the tube 14. A top wall 42 of the inlet housing is connected between the two side walls spaced above the tube for locating an inlet opening 44 therein adjacent the inner end of the inlet housing so as to be spaced rearwardly from the front end of the housing and conveyor tube.

The feed auger assembly also includes a feed auger boot 45 mounted at the outlet end of the feed auger tube which serves to couple the outlet end of the feed auger tube to main auger boot 38. The feed auger boot 45 comprises an enclosed housing which redirects material discharged from the feed auger tube downwardly through a bottom discharge opening in alignment directly above the inlet opening of the main auger boot throughout the relative pivotal movement of the feed auger assembly relative to the main conveyor. A main shaft of the feed auger protrudes through the outer end of the feed auger boot for receiving a drive input to drive the rotation of the feed auger.

A main drive 46 is mounted at the inlet end of the conveyor tube and inlet housing for receiving a drive input, for example connection to a power take off shaft of a tractor or a hydraulic output of a tractor. The main drive 46 includes a first output shaft 48 concentric with the main conveyor tube for direct connection to the main conveying member rotatable therein for driving the main conveyor screw.

A second output shaft of the main drive 46 can be used to drive a hydraulic pump which is in turn connected to a hydraulic motor (not shown) connected to the main shaft of the feed auger at the outlet end of the feed auger assembly so as to drive rotation of the feed auger relative to the feed tube.

The feed auger assembly is supported on the inlet housing by an annular driven member 50. The annular driven member is supported about the inlet opening on the top wall so as to be concentric with the swing axis for rotation with the feed auger assembly relative to the top wall of the inlet housing on the conveyor tube. The annular driven member is a pivot ring in the form of a collar extending through the inlet opening in the top wall of the main auger boot. Suitable bearings 51 rotatably support the collar 50 relative to the top wall of the main auger boot. A peripheral flange 52 protrudes radially outward from the top edge of the collar 50 at a location spaced above the top wall of the main auger boot. A circumferential gear 54 is coupled about the collar between the flange 52 and the top wall so as to be located directly above the top wall externally of the main enclosure of the main auger boot.

A support wall 56 in the form of a rigid plate is mounted parallel to and spaced above the top wall of the main auger boot by suitable spacer mounts 58 at circumferentially spaced positions about the inlet opening. A corresponding opening in the support wall receives the collar 50 extending upwardly therethrough such that the flange 52 overlaps a top side of the support wall. The circumferential gear 54 is located between the support wall 56 and the top wall.

The flange 52 at the top of the collar forming the pivot ring or annular driven member supports two pivot mounts 60 thereon at diametrically opposed sides of the inlet opening. The two mounts extend upwardly for pivotally coupling to the feed auger boot 45 (or discharge housing) for relative pivotal movement about the horizontal lift axis extending between the two pivot mounts. The feed auger assembly is pivoted about the common horizontal axis of the two pivot mounts as the height of the loading hopper is adjusted by operating of a feed auger lift assembly 62 as described in further detail below.

The rotation of the feed auger assembly about the swing axis is driven by a swing drive motor 64 comprising a hydraulic orbit motor mounted on the top wall of the inlet housing at a location spaced forwardly of the inlet opening. The motor 64 is thus spaced radially outward from the annular driven member about the inlet opening in relation to the swing axis. The motor 64 is typically mounted externally at the top side of the main auger boot with an output shaft extending through the top wall for connection to a drive sprocket 66 mounted internally within the inlet housing. A suitable drive chain 68 extends about the drive sprocket 66 and the circumferential gear 54 of the annular driven member so that the output of the swing drive motor controls the rotation of the annular driven member about the swing axis which in turn controls the swinging of the feed auger assembly connected thereto for pivotal movement about the swing axis relative to the main conveyor tube. The drive sprocket 66 and the chain 68 are also received in the space between the top wall of the auger boot and the support wall above it so as to be external from the main enclosure of the main auger boot while remaining protected and relatively enclosed by the top wall and support wall.

The feed auger assembly is pivotal through a range typically corresponding to approximately 300° from a first offset position to an opposing second offset position. In the first offset position, the feed auger assembly extends outwardly from one side of the main conveyor in a first lateral direction inclined forwardly. From the first offset position the feed auger assembly is pivotal rearwardly towards the outlet end of the main conveyor tube to an intermediate position supported by the feed auger lift assembly 62 overtop of the main conveyor in which the feed auger assembly is along the top side of main conveyor such that a longitudinal axis of the feed auger assembly and a longitudinal axis of the main auger lie in a substantially common vertical plane.

The feed auger assembly can continue to swing overtop of the main conveyor tube to the opposing side to the second offset position in which the feed auger assembly extends outwardly from the other side of the main conveyor in a second lateral direction opposite to the first lateral direction. The feed auger assembly is also inclined forwardly in the second offset position. In this manner the feed auger assembly can be pivoted between the first and second offset positions overtop of the main conveyor tube while the main conveyor tube remains connected at the hitch connection to the towing vehicle. This is particularly advantageous when it is desirable to unload particulate material from two different sources into the feed auger assembly when the two sources are on opposing sides of the main conveyor tube and the towing vehicle remains connected to the hitch connection of the main conveyor.

The feed auger lift assembly 62 generally includes two lift members 70 in the form of linear hydraulically actuated piston cylinder assemblies. The two lift members 70 are mounted at laterally and diametrically opposed sides of the outlet end of the feed tube 22. More particularly, each lift member is mounted at a first top end or piston end on the feed auger boot 45 at a junction of the boot with the outlet end of the feed tube 22. The first ends are pivotally coupled to the feed tube for relative pivotal movement about a common horizontal axis extending through the first ends of the lift members.

The opposing second bottom ends of the lift members are each supported on top of the support wall 56 which is in turn supported on the top wall of the main auger boot. A lift member mount 72 is associated with each lift member and pivotally mounts the second end of the lift member thereon such that the second ends of the lift members are pivotal relative to their respective mounts 72 about a second common horizontal axis extending therebetween. The mounts 72 are in turn supported on an annular bearing surface 74 formed on top of the support wall.

The annular bearing surface 74 is a circular track supported concentrically about the swing axis so as to extend a full circumference about the inlet opening in the top wall of the main auger boot and the corresponding opening in the support wall. The cross section of the track defining the annular bearing surface 74 is generally in the form of a channel having a central slot formed in the top side so as to be centered between two upright side flanges between which the mounts 72 are slidably received in the circumferential direction about the swing axis. The lift members together with the mounts 72 upon which they are supported are thus rotatable together about the swing axis with the feed auger assembly relative to the main auger tube and the main auger boot fixed thereon.

A portion of the interior surfaces of the track defining the annular bearing surface 74 can be lined with a suitable material having a low coefficient of friction such as plastic or other self lubricating materials for example to insure that the lift members slide relative to the bearing surface and rotate together with the feed auger assembly when driven to rotate by the swing drive 64.

The two lift members 70 are oriented to extend generally upward from the second ends on the bearing surface 74 to the first ends coupled to the feed auger assembly such that the lift members remain substantially below the outlet end of the feed auger assembly throughout the full range of lifting motion of the loading hopper relative to the main auger tube.

The lift members 70 are operated in synchronicity with one another between a retracted position substantially shown in FIG. 1 and an extended position. In the retracted position, the loading hopper is lowered adjacent to the ground and the feed auger tube extends at a downward inclination from the feed auger boot at the outlet end to the loading hopper at the inlet end.

The lift members are extended in length from the retracted position to respective extended positions such that in the extended position the hopper is raised upwardly above the ground and the feed auger tube extends at an upward inclination from the feed auger boot at the outlet end to the loading hopper at the inlet end. In the extended position the inclination of the feed auger tube is near to the upward inclination of the main conveyor from the inlet end to the outlet end thereof such that the feed auger assembly can be swung overtop of the main auger through the intermediate position described above, with sufficient clearance between the feed auger tube and the main auger tube. In the illustrated embodiment the second ends of the lift members 70 are nearer to the inlet end of the feed auger tube than the common horizontal lift axis about which the feed auger tube is pivotal relative to the main auger.

To further ensure that the lift member mounts 72 slide along the bearing surface 74 for rotation together with the feed auger assembly about the upright swing axis one or more additional guide members (not shown) can be provided for guiding the movement of the second ends of the lift cylinders in the circumferential direction about the swing axis. The guide members serve to ensure that the mounts supporting the second ends of the lift members move together with the feed auger assembly about the swing axis while not affecting pivotal movement of the feed auger tube about the horizontal lift axis relative to the mounts 72 and the bearing surface on the main auger boot upon which they are supported.

In some embodiments the guide members may comprise a rigid connection between the mounts 72 and the flange 52 of the annular driven member which also supports the pivot mounts 60 thereon. In this instance the lift member mounts 72 are pivotal together with the pivot mounts 60 about the swing axis by the fixed connection therebetween. Alternatively strap members may be mounted on opposing sides of the feed auger boot to extend about opposing external sides of the lift members 70 to maintain a fixed lateral proximity between the lift members and the feed auger boot without interfering with the varying orientation of the lift members relative to the feed auger boot as the lift members are extended and retracted during a lifting motion.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An agricultural conveyor assembly comprising:
a main conveyor comprising a main conveyor tube and a main conveying member in the main conveyor tube which is arranged to convey particulate material from an inlet end to an outlet end of the main conveyor tube;
a frame supporting the main conveyor tube at an upward incline from the inlet end to the outlet end in a working position of the main conveyor;
a loading hopper having a loading opening arranged to load the particulate material therein;
a feed auger assembly extending in a longitudinal direction from an inlet end in communication with the loading hopper so as to be arranged to receive the loaded particulate material from the loading hopper to an outlet end in communication with the inlet end of the main conveyor so as to be arranged to discharge the loaded particulate material into the inlet end of the main conveyor;
a main auger boot coupled to the inlet end of the main conveyor tube and pivotally supporting the outlet end of the feed auger assembly thereon such that the feed auger assembly is pivotal relative to the main conveyor tube about a generally upright swing axis and about a generally horizontal lift axis;
the main auger boot including an inlet opening arranged to receive the particulate material from the feed auger assembly therethrough at the inlet end of the main conveyor tube;
a bearing surface supported about the inlet opening of the main auger boot; and
at least one extendable lift member extending between a first end pivotally coupled to the feed auger assembly and a second end supported on the bearing surface for rotational movement about the swing axis together with the feed auger assembly.

2. The conveyor assembly according to claim 1 wherein the bearing surface comprises an annular member extending about a full circumference of the inlet opening.

3. The conveyor assembly according to claim 1 wherein the bearing surface is supported on an upper wall of the main auger boot.

4. The conveyor assembly according to claim 1 wherein the second end of said at least one extendable lift member is pivotally coupled to a respective lift member mount which is engaged upon the annular bearing surface.

5. The conveyor assembly according to claim 1 wherein said at least one extendable lift member comprises a pair of extendable lift members operatively connected to one another.

6. The conveyor assembly according to claim 5 wherein the feed auger assembly comprises a feed auger tube and wherein the pair of extendable lift members are connected to the feed auger assembly at diametrically opposed sides of the feed auger tube.

7. The conveyor assembly according to claim 5 wherein the second end of each extendable lift member is pivotally coupled on a respective mount which is engaged upon the bearing surface for rotational movement about the swing axis together with the feed auger assembly.

8. The conveyor assembly according to claim 1 wherein the second end of said at least one extendable lift member is supported below the first end of the extendable lift member through a full range of pivotal movement of the feed auger assembly about the lift axis.

9. The conveyor assembly according to claim 1 wherein the feed auger comprises a feed auger head pivotally coupled to the main auger boot at the outlet end of the feed auger assembly and a feed auger tube coupled to the feed auger head for pivotal movement together relative to the main conveyor, and wherein the first end of said at least one extendable lift member is coupled to the feed auger assembly adjacent a junction of the feed auger head with the feed auger tube.

10. The conveyor assembly according to claim 1 wherein the feed auger assembly further comprises a guide member connected to said at least one extendable lift member such that the second end of said at least one lift member is movable together with the feed auger assembly for rotational movement about the swing axis.

11. The conveyor assembly according to claim 1 wherein said at least one extendable lift member is operable between a retracted position in which the loading hopper is arranged to be supported adjacent to the ground and an extended position in which the lift member is extended in length between the first and second ends and the loading hopper is elevated in relation to the retracted position.

12. The conveyor assembly according to claim 1 wherein said at least one lift member is arranged for pivotal movement about the swing axis together with the feed auger assembly through an intermediate position overtop of the main conveyor between a first offset position in which the feed auger assembly extends outwardly from one side of the main conveyor in a first lateral direction and a second offset position in which the feed auger assembly extend outwardly from the other side of the main conveyor in a second lateral direction opposite to the first lateral direction, the feed auger assembly extending from the discharge end at the inlet end of the main conveyor to the loading hopper towards the outlet end of the main conveyor in the intermediate position.

13. The conveyor assembly according to claim 1 further comprising:
   an annular driven member supported about the inlet opening of the main auger boot for rotation relative to the main conveyor about the swing axis together with the feed auger assembly; and
   a swing drive motor coupled to the annular driven member so as to be arranged to rotate the annular driven and the feed auger assembly therewith about the swing axis.

14. The conveyor assembly according to claim 13 wherein the annular driven member is supported below the bearing surface.

15. The conveyor assembly according to claim 13 wherein the main auger boot comprises an upper wall supporting the bearing surface spaced thereabove, the annular driven member being received between the upper wall of the main auger boot and the bearing surface.

16. The conveyor assembly according to claim 11 wherein the swing drive motor is supported on the main conveyor spaced radially outward from the annular driven member in relation to the swing axis, and the annular driven member comprises a circumferential gear operatively connected to swing drive motor.

17. The conveyor assembly according to claim 11 wherein the feed auger assembly includes a pair of auger mounts extending upwardly from annular driven member at diametrically opposing sides of the inlet opening, the auger mounts pivotally coupling the discharge end of the feed auger assembly thereon for relative pivotal movement about substantially horizontal lift axis.

* * * * *